(12) United States Patent
McPherson et al.

(10) Patent No.: US 9,324,310 B2
(45) Date of Patent: Apr. 26, 2016

(54) MULTI-TOUCH PIANO KEYBOARD

(75) Inventors: Andrew McPherson, London (GB); Youngmoo Kim, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 109 days.

(21) Appl. No.: 14/118,900

(22) PCT Filed: Jul. 6, 2012

(86) PCT No.: PCT/US2012/045649
§ 371 (c)(1),
(2), (4) Date: Nov. 20, 2013

(87) PCT Pub. No.: WO2013/006746
PCT Pub. Date: Jan. 10, 2013

(65) Prior Publication Data
US 2014/0083281 A1    Mar. 27, 2014

Related U.S. Application Data

(60) Provisional application No. 61/505,273, filed on Jul. 7, 2011.

(51) Int. Cl.
*G10H 3/10* (2006.01)
*G10H 3/14* (2006.01)
(Continued)

(52) U.S. Cl.
CPC . *G10H 7/06* (2013.01); *G10H 1/02* (2013.01); *G10H 1/344* (2013.01); *G10H 2220/221* (2013.01); *G10H 2220/275* (2013.01)

(58) Field of Classification Search
CPC .............. G10H 2220/096; G10H 1/34; G10H 2220/241; G10H 2220/285; G10H 1/0555; G10H 1/0556; A61M 2205/505; G11C 11/5642
See application file for complete search history.

(56) References Cited

U.S. PATENT DOCUMENTS 5,187,315 A  *  2/1993  Muramatsu et al. ............ 84/688
5,530,198 A       6/1996  Ishii
(Continued)

FOREIGN PATENT DOCUMENTS

| GB | 2443450 | 5/2008 |
|---|---|---|
| WO | WO0203373 | 1/2002 |
| WO | WO 2015028793 A1 * | 3/2015 |

OTHER PUBLICATIONS

International Search Report and written Opinion for PCT/US2012/045649, mailed Oct. 29, 2012.
(Continued)

*Primary Examiner* — Marlon Fletcher
(74) *Attorney, Agent, or Firm* — Joseph E. Maenner; Maenner & Associates, LLC

(57) ABSTRACT

A musical keyboard touch sensor pad having a plurality of integrated sensors disposed in an array is disclosed. The plurality of integrated sensors represents a keyboard key. A processor is electronically coupled to the plurality of integrated sensors. The processor is programmed to receive signals from several of the plurality of integrated sensors and to generate a sound signal based on input from the several of the plurality of integrated sensors. The output is variable based on the number in the plurality and the location of the plurality in the array. An audio output device is electronically coupled to the processor to generate a sound based on the sound signal. A keyboard using a plurality of the sensor pads as well as a method of generating sounds from the keyboard are also disclosed.

9 Claims, 11 Drawing Sheets

(51) Int. Cl.
*G10H 7/06* (2006.01)
*G10H 1/02* (2006.01)
*G10H 1/34* (2006.01)

(56) References Cited

U.S. PATENT DOCUMENTS

| | | | |
|---|---|---|---|
| 5,783,765 A | 7/1998 | Muramatsu | |
| 6,121,535 A | 9/2000 | Muramatsu | |
| 6,239,389 B1* | 5/2001 | Allen et al. | 178/18.01 |
| 6,703,552 B2 | 3/2004 | Haken | |
| 8,702,513 B2* | 4/2014 | Lim | 463/37 |
| 8,816,986 B1* | 8/2014 | Park | G06F 3/044 345/173 |
| 9,041,663 B2* | 5/2015 | Westerman | 345/173 |
| 2002/0005108 A1 | 1/2002 | Ludwig | |
| 2003/0209130 A1* | 11/2003 | Anderson et al. | 84/443 |
| 2005/0126364 A1* | 6/2005 | Ludwig | 84/293 |
| 2005/0126378 A1* | 6/2005 | Ludwig | 84/746 |
| 2006/0187214 A1* | 8/2006 | Gillespie et al. | 345/173 |
| 2007/0296712 A1* | 12/2007 | Li | G06F 3/0362 345/184 |
| 2008/0246723 A1* | 10/2008 | Baumbach | G06F 3/03547 345/156 |
| 2009/0282962 A1 | 11/2009 | Jones et al. | |
| 2010/0053105 A1* | 3/2010 | Choi | 345/173 |
| 2010/0287471 A1* | 11/2010 | Nam et al. | 715/702 |
| 2011/0100198 A1* | 5/2011 | Gatzsche et al. | 84/615 |
| 2012/0174735 A1* | 7/2012 | Little et al. | 84/613 |
| 2013/0068085 A1* | 3/2013 | Yoshikawa | 84/645 |
| 2013/0082951 A1* | 4/2013 | Tanaka et al. | 345/173 |
| 2013/0257784 A1* | 10/2013 | Vandermeijden et al. | 345/174 |
| 2013/0265262 A1* | 10/2013 | Jung et al. | 345/173 |
| 2013/0271161 A1* | 10/2013 | Solven et al. | 324/661 |
| 2014/0015746 A1* | 1/2014 | Hargreaves et al. | 345/157 |
| 2014/0083279 A1* | 3/2014 | Little et al. | 84/609 |
| 2014/0083281 A1* | 3/2014 | McPherson et al. | 84/615 |
| 2014/0260908 A1* | 9/2014 | Yoshikawa | 84/609 |

OTHER PUBLICATIONS

International Preliminary Report on Patentability for PCT/US2012/045649, mailed Jan. 7, 2014.

Freed, A. et al. "Features and future of Open Sound Control version 1.1 for NIME", Proceedings of the Conference on New Interfaces for Musical Expression (NIME), Pittsburgh, PA 2009.

Moog, R.A. et al. "Evolution of the keyboard interface: The Bosendorfer 290 SE recording piano and the Moog multiply-touch-sensitive keyboards", Computer Music Journal, vol. 14, No. 2, p. 52-60, summer 1990.

Freed, A. et al. "A new music keyboard featuring continuous key-position sensing and high-speed communication options", Proceedings of International Computer Music Conference, Berlin, Germinay 2000.

McPherson, A. et al., "Augmenting the acoustic piano with electromagnetic string actuation and continuous key position sensing", Proceedings of NIME, Sydney, Australia, 2010.

McPherson, A. et al. "Multidimensional gesture sensing at the piano keyboard" Proceedings of the 29th ACM Conference on Human Factors in Computing systems, Vancouver, Canada, 2011.

Haken, L. et al. "An indiscrete music keyboard", Computer Music Journal, vol. 22, No. 1, pp. 30-48, 1998.

Paradiso, J.A. et al. "Musical application of electric field sensing", Computer Music Journal, vol. 21, No. 2, pp. 69-89, 1997.

Guaus, E. et al. "A left hand gesture caption system for guitar based on capacitive sensors", Proceedings of NIME, Sydney, Australia, 2010.

Wanderley, M. et al. "Gestural Control of sound synthesis" Proceedings of the IEEE, vol. 92, No. 4, pp. 632-644, 2004.

* cited by examiner

MULTI-TOUCH PIANO KEYBOARD

CROSS-REFERENCE TO RELATED APPLICATION

This application is a 371 of PCT application PCT/US2012/045649, filed on Jul. 6, 2012, which claims priority from U.S. Provisional Patent Application Ser. No. 61/505,273, filed on Jul. 7, 2011, both of which are incorporated herein by reference in their entireties.

STATEMENT OF GOVERNMENT INTEREST

This invention was made with government support under Contract No. 0937060 awarded by the National Science Foundation. The government has certain rights in the invention.

FIELD OF THE INVENTION

The present invention relates to a hardware and software system for adding multiple touch sensitivity to a piano-style keyboard and a method of generating sounds from the keyboard.

BACKGROUND OF THE INVENTION

Over the past decades, a great many electronic music controllers have been developed, but few approach the ubiquity of the piano-style keyboard. The keyboard's versatility and its large number of skilled performers ensure that it will maintain a prominent place in digital musical performance for the foreseeable future.

The keyboard is by nature a discrete interface; on acoustic piano as well as on most MIDI keyboards, notes are defined solely by onset and release, giving the performer limited control over their shape. Although certain MIDI keyboards are equipped with after-touch (key pressure) sensitivity, this arrangement tends to lack nuance and flexibility. On these keyboards, a key must be completely pressed before after-touch can be used, so after-touch cannot control articulation. After-touch is also difficult to use in rapid passage work, and control is limited to a single dimension. Though some keyboards also provide continuous control through external knobs, wheels or sliders, these lack the immediacy and expressivity of control through the keyboard itself.

It would therefore be beneficial to provide a keyboard that provides nuanced and flexible control of musical sounds from within the keyboard mechanism itself.

BRIEF SUMMARY OF THE INVENTION

Briefly, the present invention provides a musical keyboard touch sensor pad comprising a plurality of integrated touch sensors disposed in an array. The plurality of integrated touch sensors represent a keyboard key. A processor is electronically coupled to the plurality of integrated touch sensors. The processor is programmed to receive input from several of the plurality of integrated touch sensors and to generate a sound signal based on the input from the several of the plurality of integrated touch sensors. The sound signal is variable based on the number in the plurality and the location of the plurality in the array.

Further, the present invention provides a musical keyboard comprises a plurality of keys and an integrated sensor array disposed on each of the plurality of keys. A controller is electronically coupled to each of the integrated sensor arrays by a communication bus. The controller has an audio signal output.

Additionally, the present invention provides a method of generating a sound from a piano-style key comprising the steps of placing a sensor array on the key, the sensor being comprised of a plurality of integrated sensors, the sensor array being electronically coupled to a processor; receiving an impact on the key such that at least one of the plurality of the integrated sensors are struck; transmitting an electronic input signal to the processor based on the location and type of the strike on the at least one of the plurality of the integrated sensors; and generating an electronic sound signal from the controller based on the electronic input signal.

Also, the present invention provides a method of displaying information relating to the location of a finger on a piano keyboard. The method comprises the steps of placing a sensor array on the key, the sensor array being comprised of a plurality of integrated sensors, the sensor array being electronically coupled to a processor; receiving an impact on the key such that at least one of the plurality of integrated sensors are struck; transmitting a sensor signal from each of the at least one of the plurality of integrated sensors to the processor; and transmitting a processor signal to a display, wherein the display displays the location and the size of the impact based on the electronic signal.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1A:
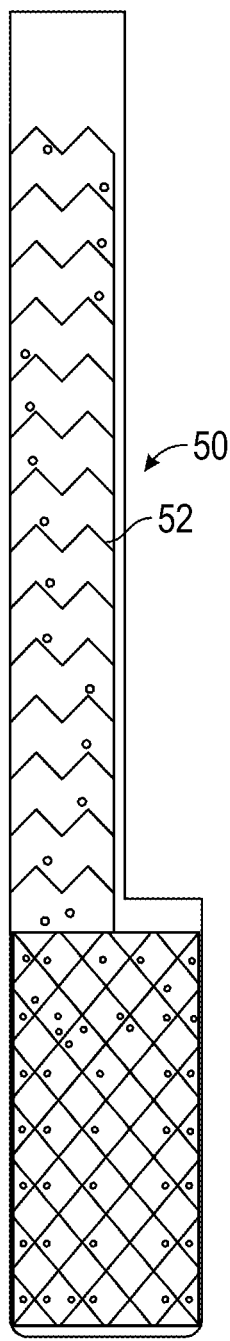
FIG. 1A is a top plan view of a first white key incorporating sensors according to an exemplary embodiment of the present invention.

In the drawings, like numerals indicate like elements throughout. Certain terminology is used herein for convenience only and is not to be taken as a limitation on the present invention. The term "longitudinal" refers to a direction along the line between a free end of a piano key and a connected end of the piano key. The term "lateral" refers to a direction along the line perpendicular to the longitudinal direction, from one side of the piano key to the other side of the piano key, between adjacent piano keys. Further, the term "simultaneous strikes" may refer to a plurality of fingers striking a key simultaneously as well as a plurality of fingers simultaneously engaging a key. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

The present invention augments a traditional musical keyboard key by generating novel sounds based on various key striking and movement iterations. The present invention adds touch sensitivity to the keyboard and creates an interface capable of continuous, expressive control that provides a performer with detailed, continuous control over the pitch of musical notes. For example, a traditional keyboard limits a performer to 12 discrete pitches within each octave; by contrast, a violin player has no such limitations and can even adjust the pitch of the note over time for expressive purposes (e.g. vibrato or pitch bends). Touch sensitivity on the keys of the present invention can be used to make keyboard capable of continuously controlling pitch. Such control can take several forms such as, for example the location of a performer's initial touch on the key can select between subtly different pitches, wherein a touch on the front half of the key plays a note in normal tuning, while a touch on the back half of the same key plays a note a quarter tone higher. Alternatively, finger motions on the keyboard after a note has been played can alter the pitch of the note. For example, moving the finger back and forth on the key surface can create vibrato, or a slide from the front to the back of the key can bend the pitch of the note either up or down.

Additionally, the present invention can be used as a teaching tool to assist in detecting fingering of keys. Such detection can determine whether a student is properly fingering the keys and aid a teacher in instructing the student on the proper manner to finger the keys to generate a desired sound. Staff In an exemplary embodiment, sounds are generated from struck keyboard keys based on the position and size of up to three touches on each key. Touch position on each black key is sent along a single front-to-back, or longitudinal, direction; and white touches are sensed along a longitudinal direction on the narrow back portion and along the longitudinal direction and a lateral direction, perpendicular to the longitudinal direction, along the wider front portion of each key. Referring to the figures in general, a multi-touch musical keyboard system 99 according to an exemplary embodiment of the present invention is shown.

Figure 1B:
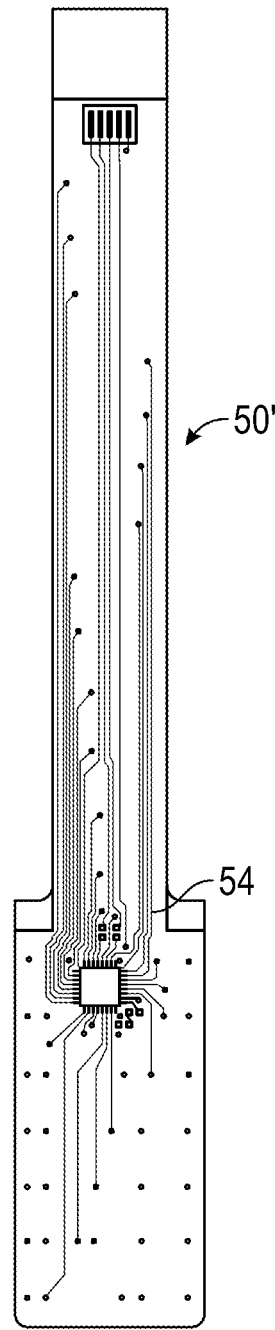
FIG. 1B is a bottom plan view of a second white key incorporating a circuit board with an integrated circuit controller according to an exemplary embodiment of the present invention.

Referring specifically to FIGS. 1A-1G, a plurality of musical keyboard keys according to an exemplary embodiment of the present invention are shown. Each key includes a circuit board with an integrated circuit controller. FIG. 1A illustrates a first white key 50 with a longitudinal and lateral integrated capacitive sensor array 52 mounted thereon. FIG. 1B illustrates a second white key 50' with a circuit board layer 54 that provides electronic connections to a capacitive array (not shown) on key 60. Circuit board layer 54 is located beneath capacitive array 52.

Figure 1C:
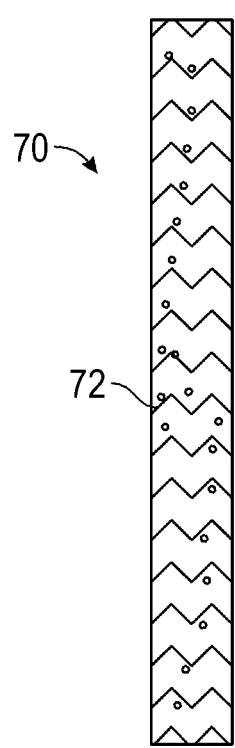
FIG. 1C is a top plan view of a black key cooperating sensors according to an exemplary embodiment of the present invention.
Figure 1D:
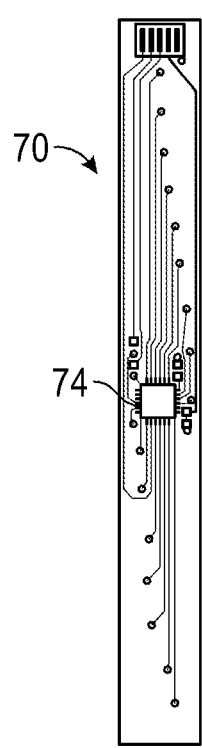
FIG. 1D is a bottom plan view of the black key of FIG. 1C.

FIG. 1C illustrates a black key 70 with only a longitudinal integrated capacitive sensor array 72 mounted thereon. Those skilled in the art, however, will recognize that black key 70 may also include a lateral capacitive array (not shown) as well. FIG. 1D illustrates black key 70 with a circuit board layer 74 that provides electronic connections for capacitive array 72, with circuit board layer 74 being located beneath capacitive array 72. While capacitive sensor arrays 52, 72 are shown, those skilled in the art will recognize that arrays 52, 72 may be constructed from other types of touch sensors instead.

Figure 1E:
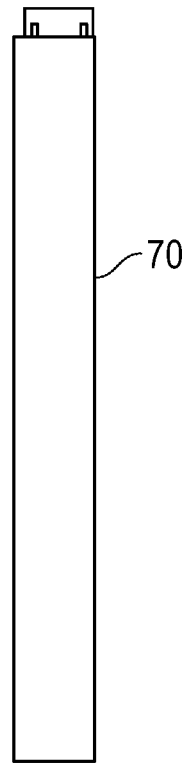
FIG. 1E is a top plan view of the black key of FIG. 1C, with a black plastic covering thereon.
Figure 1F:
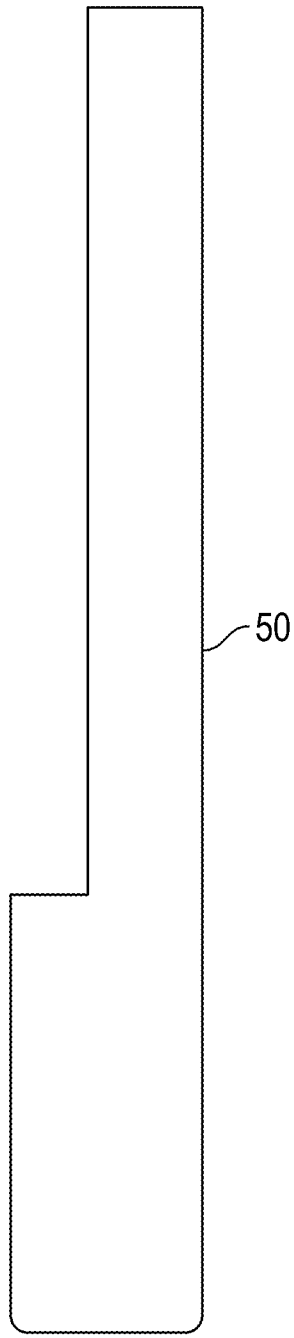
FIG. 1F is a top plan view of the white key of FIG. 1A, with a white plastic covering thereon.
Figure 1G:
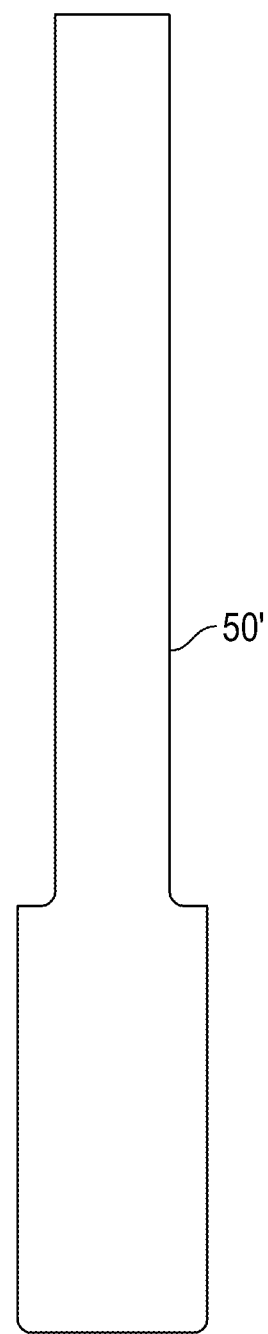
FIG. 1G is a top plan view of the white key FIG. 1B, with a white plastic covering thereon.

As shown in FIGS. 1E-1G, the top surface of each key 70, 50, 50', respectively, is laminated with a thin covering to provide a similar feel to the traditional keyboard surface. Such a covering may be, for example, plastic, epoxy, lacquer, paint, or other suitable material. The bottom surface (not shown) of each key 50, 50', 70 is laminated with a thicker plastic sheet cut out around the components to provide a flat mounting surface, resulting in a sensor pad assembly that is approximately 3 mm thick. The inventive assembly can be used to replace conventional key tops on acoustic pianos or can be removably fastened atop an existing keyboard, such as for example, for molded plastic electronic keyboards. Capacitive arrays 52, 72 and circuit board layers 72, 74 are thin enough that they do not substantially change the height or feel of the keyboard. Alternatively, the inventive assembly may be constructed as part of each individual key on a keyboard.

Figure 2:
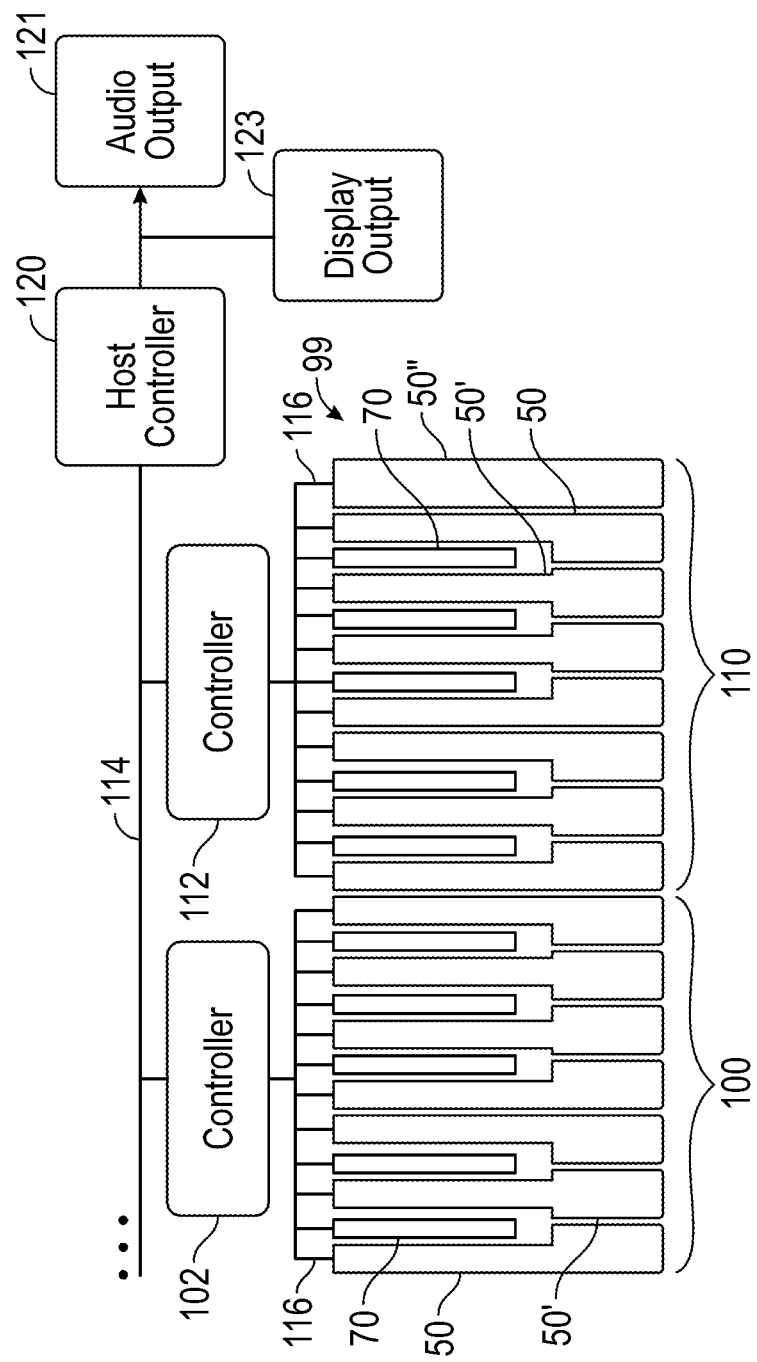
FIG. 2 is a top plan view of two octaves of keys according to an exemplary embodiment of the present invention that are electronically coupled to a controller board.

FIG. 2 shows inventive system 99 using two octave controllers 102, 112 of the inventive keys 50, 50', 70 attached to a controller board 120, which communicates with an audio output device 121 via a Universal Serial Bus (USB) connection (not shown). While, in the exemplary embodiment, controllers 102, 112 each control a full octave, those skilled in the art will recognize that controllers 102, 112 can control less than a full octave or more than a full octave.

In an exemplary embodiment, each key is scanned 125 times per second. This two-layer protocol (octave controllers 102, 112 and controller board 120) imposes only modest demands on keys 50, 50', 70 themselves, which ultimately allows the connection of a large number of keys 50, 50', 72 controller board 120.

The host computer processes raw data from each key to extract higher-level features, including the addition and removal of touches on the key, motion and resizing of existing touches, and multi-finger gestures including pinches and slides. A "pinch" is a change in distance between two fingers (closer or farther). A "slide" is two fingers moving together up or down a key, with consistent spacing between the fingers.

In an exemplary embodiment, each key 50, 50', 70 uses a Cyprus Semiconductor CapSense controller, manufactured by Cyprus Semiconductor Corporation, located in San Jose, Calif. The controllers are mounted on circuit board 54, 74 with a plurality of capacitive sensor pads 52, 72. Exemplary capacitive sensor pads 52, 72 are part of their respective board 54, 74. In one embodiment, sensor pads 52, 72 may be copper etched into board 54, 74, although those skilled in the art will recognize that any conductive material, including conductive ink, may be used.

In an exemplary embodiment, each white key 50, 50' uses 25 sensor pads 52 arranged in a two-dimensional array along the longitudinal and lateral directions of white key 50, 50', while each black key 70 uses 17 sensor pads 72 arranged in a one-dimensional array only along the longitudinal direction of black key 70. Each pad 52, 72 forms a capacitor with respect to free space and the ground plane internal to the circuit board. A finger on or near the sensor surface increases its capacitance, which the controller reads as a 10-bit value. On startup of the keyboard, each controller 120 reads baseline values for each sensor pad with no finger present, subtracting these baseline values from subsequent readings. No electrical contact is required between the performer's finger and the capacitive sensors, and, unlike resistive touch sensors, no pressure is required.

Figure 3:
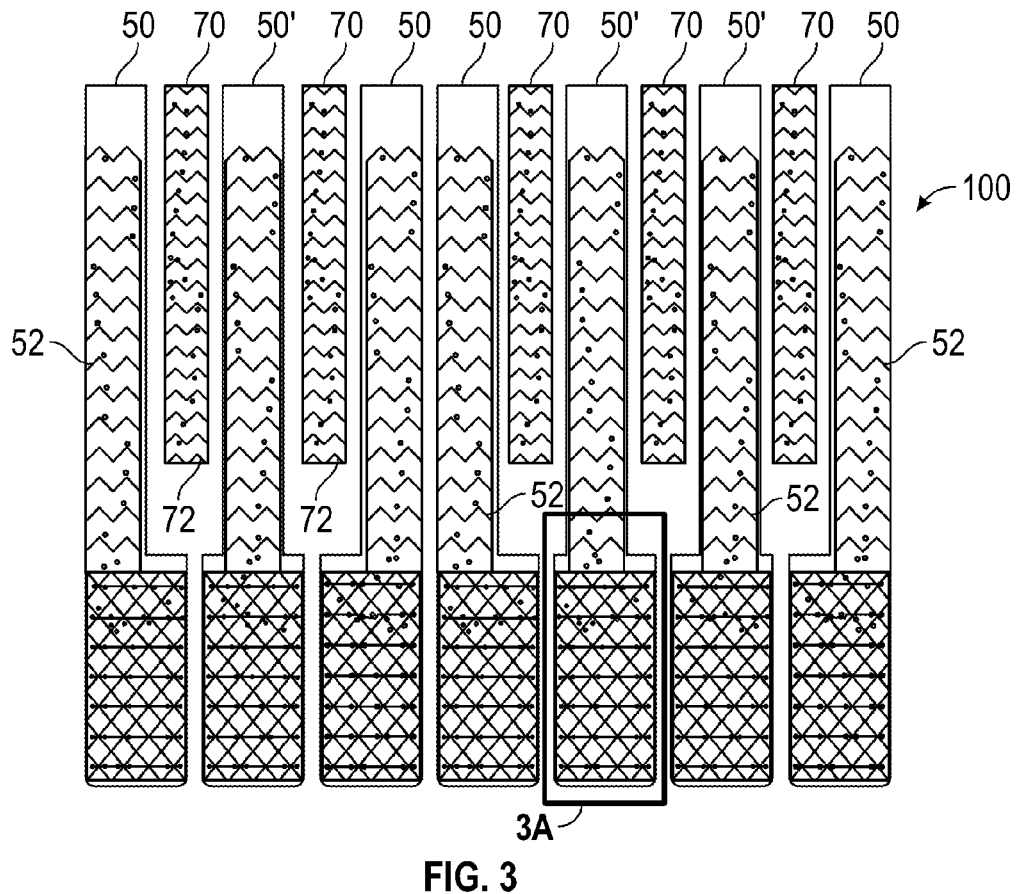
FIG. 3 is a schematic view of an exemplary sensor arrangement on both black and white keys.
Figure 3A:
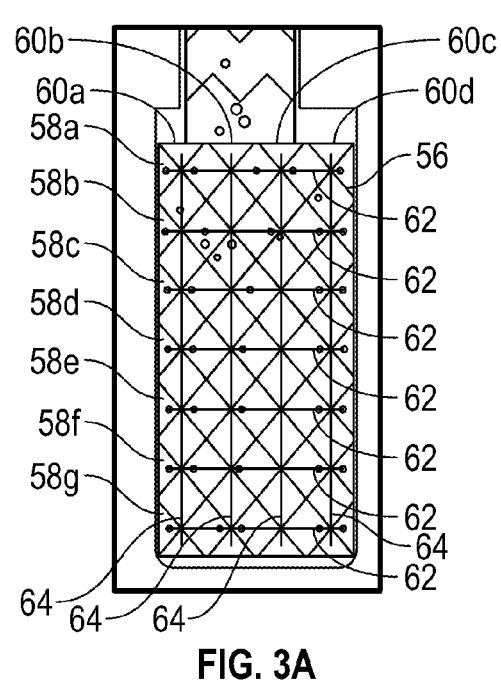
FIG. 3A is an enlarged view of a free end of a white key shown in FIG. 3.

FIGS. 3 and 3A shows exemplary layouts of sensor pads 52, 72, which are designed so that any finger touch activates several adjacent sensors. Referring to FIG. 3, on black keys 70 and the narrow, upper, part of white keys 50, 50', the sensor pads 72, 52, respectively form a linear slider capable of measuring touch position in one dimension, namely the longitudinal direction.

On the wider, lower, part of the white keys, shown in an enlarged view of key 50' in FIG. 3A, small, generally diamond-shaped pads 56 are collected into an interlocking array of seven lateral rows 58A-G and four longitudinal columns 60A-D using circuit board 54, 74, allowing longitudinal and lateral positions to be sensed. A first set of wires 62 connects sensor pads 56 into rows and a second set of wires 64 connects sensor pads 56 into columns.

Figure 4:
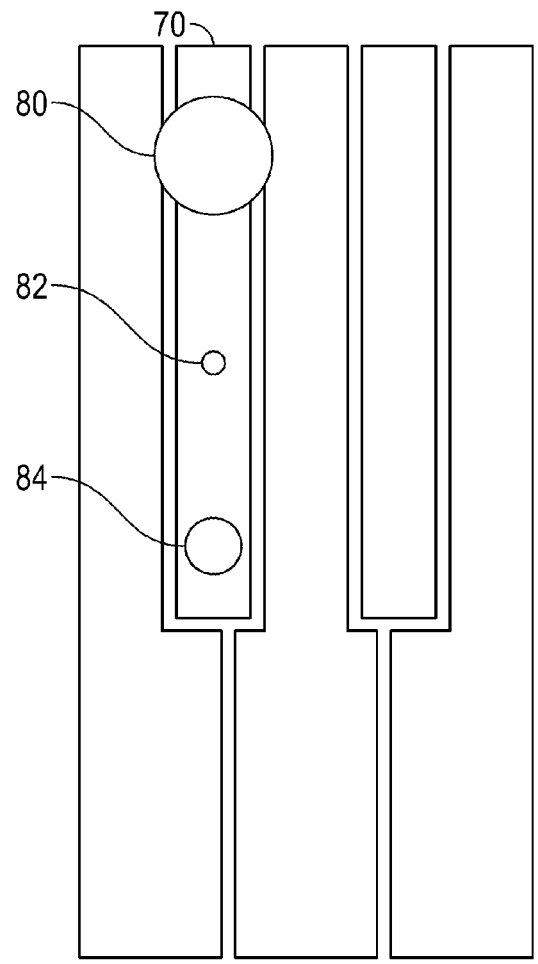
FIG. 4 is a schematic view showing a three finger touch on a black key according to an exemplary embodiment of the present invention.

FIG. 4 discloses an exemplary three-finger touch on black key 70, with circles 80, 82, 84 representing touch location and size on key 70. Position is calculated as the centroid of the group of adjacent active sensor pads 72 according to the formula:

$$\text{Centroid} = \left(\sum_{k=I_s}^{I_f} kC_k\right) / \left(\sum_{i=I_s}^{I_f} C_k\right) \quad \text{Equation 1}$$

where $I_s \le k \le I_f$ defines a range of sensor indices and the $C_k$ represents capacitance values. Touch size (contact area) is proportional to the sum of all sensors in a group according to the formula:

$$\text{Size} = \sum_{k=I_s}^{I_f} C_k \quad \text{Equation 2}$$

Raw centroid and size values are scaled on a 0-1 range for later processing. Multiple independent touches can be sensed as long as their spacing exceeds the distance between adjacent sensor pads 72. In an exemplary embodiment, the distance is 4.75 mm for black keys 70 and 6.6 mm for white keys 50, 50'. Centroid calculations are performed on a CapSense controller. In an exemplary embodiment, a limit of 3 touches per key is chosen to provide a reasonable cap on calculation time. Those skilled in the art, however, will recognize that more or less than 3 touches per key can be used. In an exemplary embodiment, a complete sensor scanning calculation centroids takes approximately 4 milliseconds. Calculated longitudinal spatial resolution on black keys 70 is 0.8 millimeters. On white keys 50, 50', resolution is 0.11 millimeters in the longitudinal direction and 0.09 millimeters in the lateral direction.

Figure 4A:
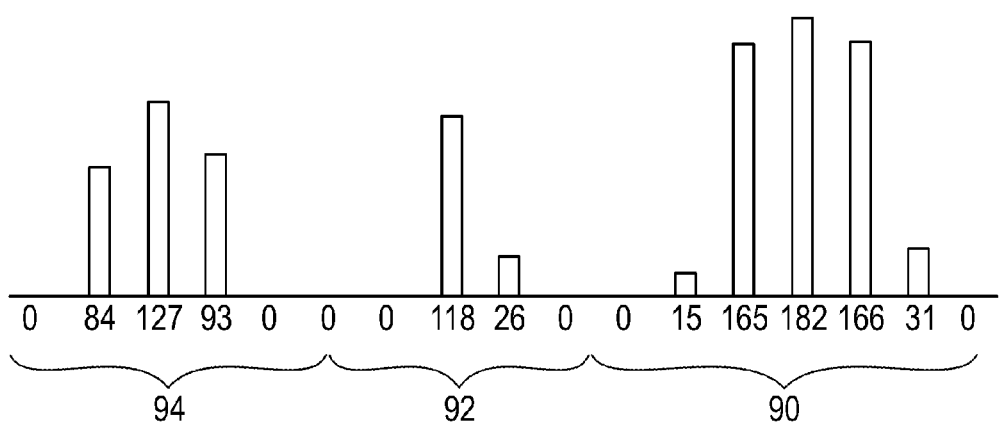
FIG. 4A is a bar graph illustrating sensor readings for the touches on the key in FIG. 4.

FIG. 4A shows exemplary discrete sensor pad readings 90, 92, 94 that are converted to touch position and size by calculating the centroid of multiple adjacent sensor values for the three finger positions 80, 82, 84 shown on key 70 in FIG. 4. The sensor pad readings 90 in FIG. 4A correspond to the top touch location 80 in FIG. 4; the sensor pad readings 92 in FIG. 4A correspond to the middle touch location 82 in FIG. 4; and the sensor pad readings 94 in FIG. 4A correspond to the bottom touch location 84 in FIG. 4.

Referring back to FIG. 2, an exemplary communication path according to the present invention for octaves 100, 110 is shown. In an exemplary embodiment, each key 50, 50', 70 transmits its calculated centroids and size signal data on a 400 kilobits per second I2C bus 101, 111. Each octave 100, 110 uses a separate I2C bus 101, 111 controlled by an Amtel AVR microcontroller 102, 112, respectively. Each "octave controller" 102, 112 gathers the signal data from each key 50, 50', 70 and transmits the signal data across a shared SPI connection 114 running at 4 megabits per second. Flat ribbon cables (shown as element 116 in FIG. 2) are used to connect the keys 50, 50', 70 to octave controllers 102, 112 to allow unimpeded key motion. System operation is ultimately controlled by a host controller 120, such as, for example, an Atmel AVR with native USB capability, which gathers the data from SPI connection 114 and transmits the data as touch locations and contact areas to a computer (not shown) electronically coupled to host controller 120 be a connection, such as, for example a USB. Host controller 120 is also responsible for regulating the timing of the sensor scans, initialization, and managing scan parameters. Host controller 120 regulates when each key 50, 50', 70 is queried for data, and host controller 120 can also communicate with each key 50, 50', 70 individually to change the settings of the CapSense controller on the key. The resulting output from the computer is a sound signal that is transmitted to audio speakers (not shown) that generate a sound based on the sound signal generated by host controller 120.

In an exemplary embodiment, up to 8 octaves of keys 50, 50', 70 can be managed by a single host controller 120, although only two octaves 100, 110 are shown in FIG. 2. As shown in FIG. 2, host controller 120 contains two octaves 100, 110 of keys 50, 50', 70 with the connection for a 13th key 50" on the upper octave 110, since most keyboards end with a high C note. To use more than two octaves 100, 110, multiple boards 102, 112 may be daisychained through flat ribbon cable connectors (not shown) on either end. On startup, host controller 120 dynamically determines the number of attached octaves.

Host controller 120 appears to the computer as a USB communication class (CDC) device, which is natively supported by all major operating systems. Alternatively, host controller 120 may be similarly be implemented as a USB MIDI device. Parsing software reads the incoming frames of test data, producing Open Sound Control messages reflecting both raw touch values and higher-level gestural features. OSC is a network communication protocol for control of musical systems and is available at www.opensoundcontrol.org. OSC messages can be sent to any port on the computer or on a network (not shown), allowing connection to a broad array of synthesis software, such as for example SuperCollider, Max/MSP, Csound. The software further allows OSC messages to be converted to MIDI messages, allowing control of any MIDI-compatible hardware or software synthesizer.

For each key 50, 50', 70, transmitted OSC frames contain the octave and pitch class, the position and size of up to three touches (range 0-1, or −1 when not active), and, for white keys 50, 50', a single horizontal position (−1 if the touch is not on the wide front part of the key). In an exemplary embodiment, the inventive device measures the longitudinal location of up to three touches and a single horizontal position.

Horizontal position sensing on white keys 50, 50' allows the keyboard to emulate a ribbon controller in that a touch can be tracked as the touch slides laterally across multiple keys 50, 50'. When the touch reaches the outer edge of one key 50, a new touch will register at the adjacent edge of the next key 50'. The system software stitches these touches together in a dedicated OSC "sweep" message containing a continuous location on the keyboard as well as information on the keys 50, 50' currently sensing the sweep. This mode of interaction is particularly well-suited for musical interactions based on glissandos or heavy pitch vibrato, although slide messages can also be mapped to any continuous control application.

Figure 5A:
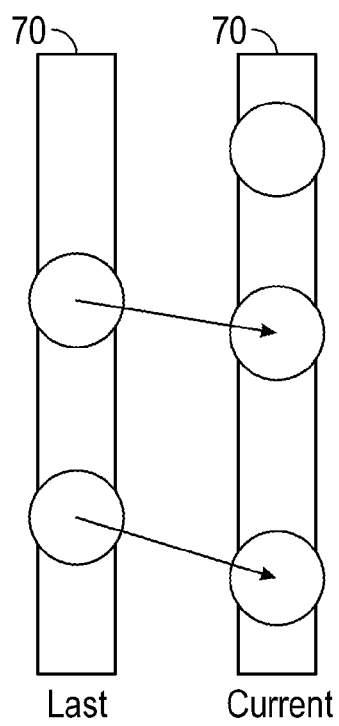
FIG. 5A is a schematic diagram showing the movement of two fingers on a key and the addition of a third finger on the key according to an exemplary embodiment of the present invention.
Figure 5B:
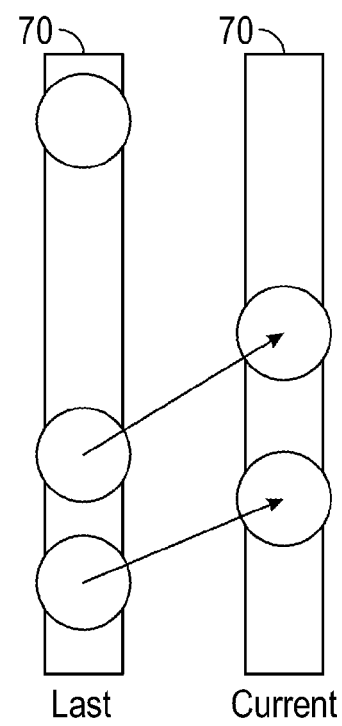
FIG. 5B is a schematic diagram showing the movement of two fingers on a key and the removal of a third finger on the key according to an exemplary embodiment of the present invention.
Figure 6A:
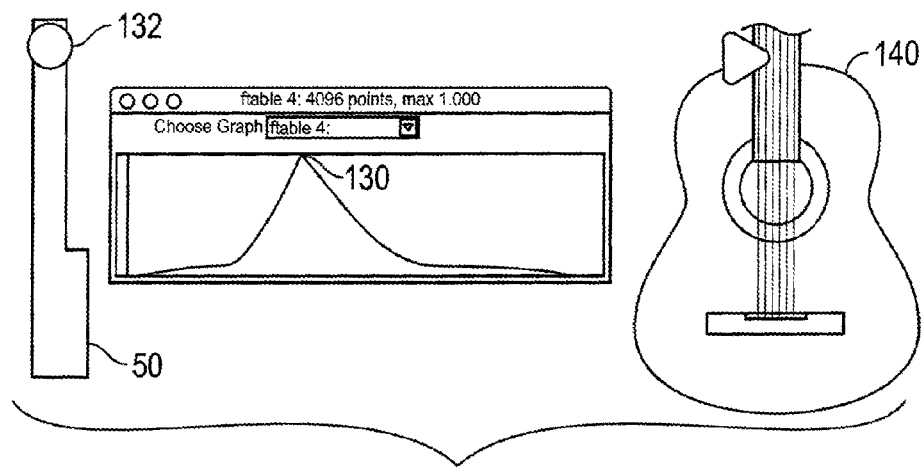
FIG. 6A is a schematic representation of a first finger touch on the key, a corresponding note mapped graphically, and a corresponding pluck location for the note on a guitar according to an exemplary embodiment of the present invention.
Figure 6B:
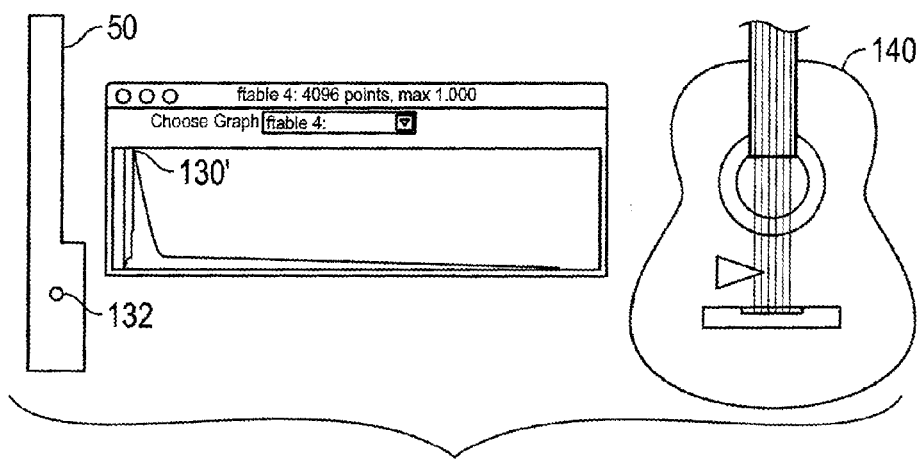
FIG. 6B is a schematic representation of a second finger touch on the key, a corresponding note mapped graphically, and a corresponding pluck location for the note on a guitar according to an exemplary embodiment of the present invention.
Figure 7:
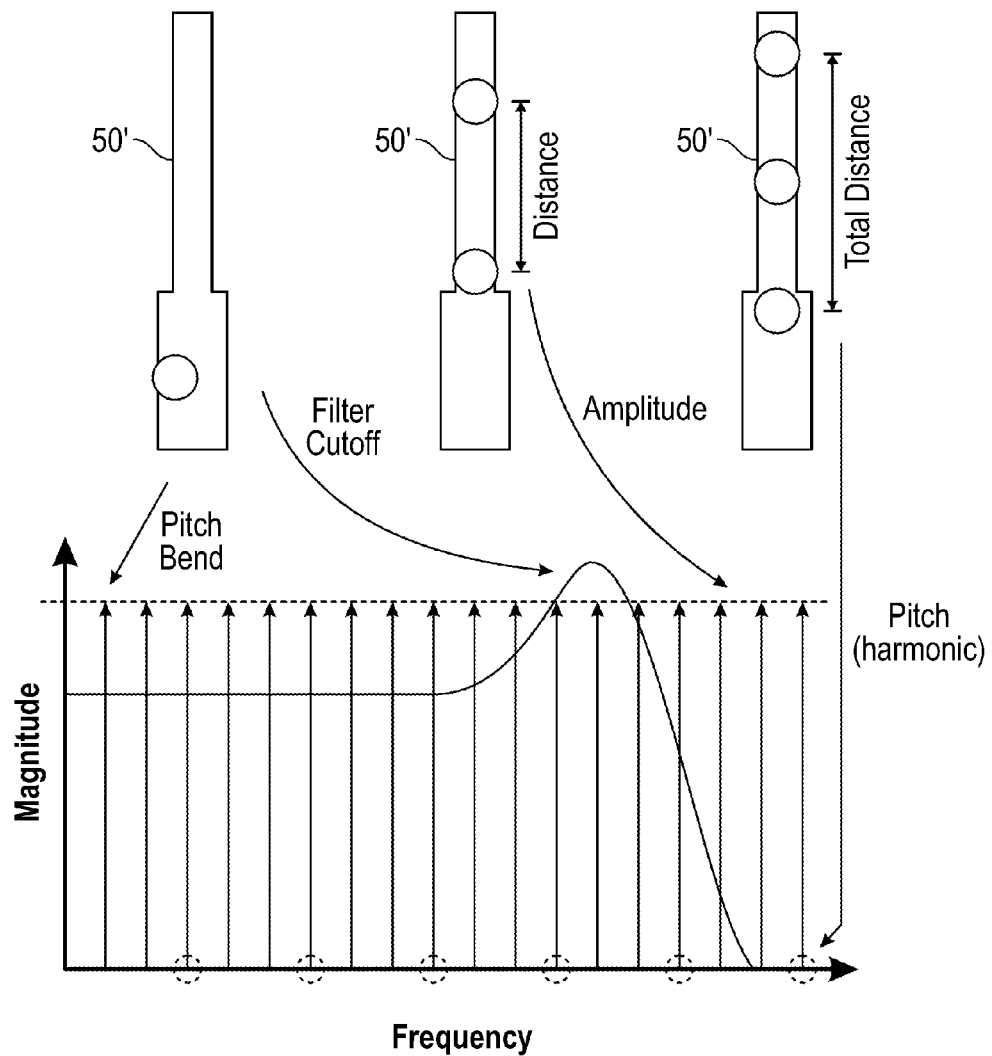
FIG. 7 is a schematic representation showing note modifications based on finger movement and number of fingers on a key according to an exemplary embodiment of the present invention.

Data arrives at octave controller 100, 110 from the keys 50, 50', 70 as a series of discrete frames, but to provide expressive control over the musical process, the frames are stitched together into a continuous picture of the performer's gestural interaction with the keyboard. As illustrated FIGS. 6A and 6B, when multiple touches are considered on a single key, calculations are required. Each new touch is assigned a unique identifier from one frame to the next. When the number of touches changes from one scan to the next, as shown on and exemplary black key 70 in FIGS. 6A and 6B, octave controller 102, 112 decides which touch was added (as shown FIG. 5A) or removed as shown FIG. 5B) by minimizing the overall distance traveled by the continuing touches. Table 1, below, summarizes the higher-level features that can be extracted by octave controller 102, 112, which include not only single-finger gestures, but also multi-finger pinch and slide gestures often found on multi-touch mobile and tablet devices. Each mode of interaction can be mapped to distinct sound production behavior. The variables "i" and "f" in the column titled "Types" represent integer and floating-point data, respectively.

TABLE 1

| OSC Path | Types | Data Contents | Description |
|---|---|---|---|
| /touchkeys/raw | iifffffff | Octave (0-7), note (0-12), location/size pairs: [0, 1, 2] (range 0-1, or −1 if not active), horizontal location (−1 for black keys or rear portion of white keys) | Raw touch data |
| /touchkeys/on | ii | Octave, note | Key became active |
| /touchkeys/off | ii | Octave, note | All touches ended |
| /touchkeys/add | iiiifff | Octave, note, touch ID, total # touches (1-3), new vertical location (0-1), new size (0-1), new horizontal location | New touch added |
| /touchkeys/remove | iiii | Octave, note, ID, # remaining touches (1-2) | Existing touch removed |
| /touchkeys/move | iiiff | Octave, note, ID, vertical location, horizontal location | Existing touch moved |
| /touchkeys/resize | iiif | Octave, note, ID, size | Existing touch changed size |
| /touchkeys/twofinger/pinch | iiiif | Octave, note, ID 0, ID 1, distance between touches | Two fingers pinched together or pulled apart |
| /touchkeys/twofinger/slide | iiiif | Octave, note, ID 0, ID 1, (unweighted) centroid between touches | Two fingers moved up or down together |
| /touchkeys/threefinger/pinch | iiiiif | Octave, note, ID 0, ID 1, ID 2, distance between outer touches | Pinch with three fingers on key |
| /touchkeys/threefinger/slide | iiiif | Octave, note, ID 0, ID 1, ID 2, (unweighted) centroid of all three touches | Slide with three fingers on key |
| /touchkeys/multi-key/sweep | iifiiifiiif | Sweep ID, sweep octave position, sweep note position, key 0: [octave, note, touch ID, horizontal position], key 1: [octave, note, touch ID, horizontal position] | Continuous sweep across multiple white keys |
| /touchkeys/multikey/sweep-off | i | Sweep ID | Multi-key sweep ended |

Some exemplary applications of system 99 are presently described. System 99 uses Csound software to create a virtual instrument which simulates a plucked string using the Karplus-Strong algorithm. Csound software is a sound design, music synthesis and signal processing system software released under the GNU Lesser General Public License by the Music and Cognition Group of the M.I.T. Media Laboratory.

On many acoustic string instruments, including the guitar, harp, and violin, performer directly manipulate the instruments strings to produce a sound. By contrast, a pianist interacts with the piano strings through a mechanical abstraction: a key press activates a series of levers, which caused a hammer to strike the strings. This mechanical system limits the degrees of freedom available to the pianist. Whereas a guitarist can vary the pluck location along the length of the guitar, as well as the strength, angle, and plucking object, the pianist only controls a single dimension, that being the velocity of the hammer, which is determined by the velocity of the present of a particular key.

The present invention allows a user to perform with expressive dimensions similar to those available to players of plucked string instruments, as discussed immediately above. This feature is the compass by mapping dimensions of key touch to parameters of a physically-modeled digital synthesizer. In an exemplary embodiment, a theoretical position of touch along the key maps to the pluck location along a virtual string and the contact area maps to the size of the object used to pluck the string. For example, the timbre of a synthesized pluck depends heavily on the initial conditions of a virtual string. System 99 uses touch location and type size, which is measured at the time of note onset, and control the location and sharpness of the pluck. Specifically, the string's initial position is given by two cubic segments, meaning that the string's displacement before and after the pluck point is modeled by a cubic polynomial, as shown FIGS. 6A and 6B. The location of the peak 130, 130' along the string corresponds to the touch location 132, 132' on a key 50, and a smaller type size (as shown FIG. 6B) produces a sharper curvature. Both of the mappings simulate the conditions of actual physical string plucks on a guitar 140. For example, a touch with the fingertip near the free end of a key produces a bright, thin sound, where touch with the ball of the finger in the middle of the key produces a rounder timbre with reduced high-frequency content.

Additionally, system 99 uses the Modartt PianoTeq synthesis software (available at www.pianoteq.com), which allows all major mechanical parameters to be dynamically assigned by MIDI control change messages. Key velocity controls the volume of the note. Vertical touch position on the key at onset is mapped to a hammer strike point within a constrained range around a default location, giving the pianist more control over the timbre of each note while ensuring sensible musical results. Such size maps to hammer hardness (e.g., smaller touches produced a harder hammer). These mappings provide keyboard player intuitive sense of interacting directly with the piano strings.

System 99 provides different features when multiple fingers are involved in striking/engaging a single key. In an exemplary embodiment, mapping of a note played with two fingers increases the unison with of the piano strings in proportion to the distance between the touches, which creates a "honky-tonk piano" effect when the fingers are widely spaced.

Additionally, the width between the two fingers modulates the impedance of the bridge, which affects note decay. Widely spaced fingers create an unusually long sustain, and closely spaced fingers create notes with a clipped, muted quality.

In another exemplary use of system 99, a Csound instrument is formed in which a harmonically-rich pulse waveform is passed through a resonant low-pass filter, similar to many classic analog synthesizer topologies. As shown FIG. 8, using one finger, vertical position on the keys controls filter cutoff frequency, and on the white keys, lateral positioning can be used to bend the pitch up and down. The volume of the note can be changed with a two-finger "pinch" gesture, with a wider distance between fingers corresponding to a higher amplitude. When three fingers are used, total finger spacing ("pinch") moves the note's fundamental frequency up the harmonic series of that key, with wider distance selecting a higher harmonic. The average position of the three fingers ("slide") controls filter cutoff.

Figure 8:
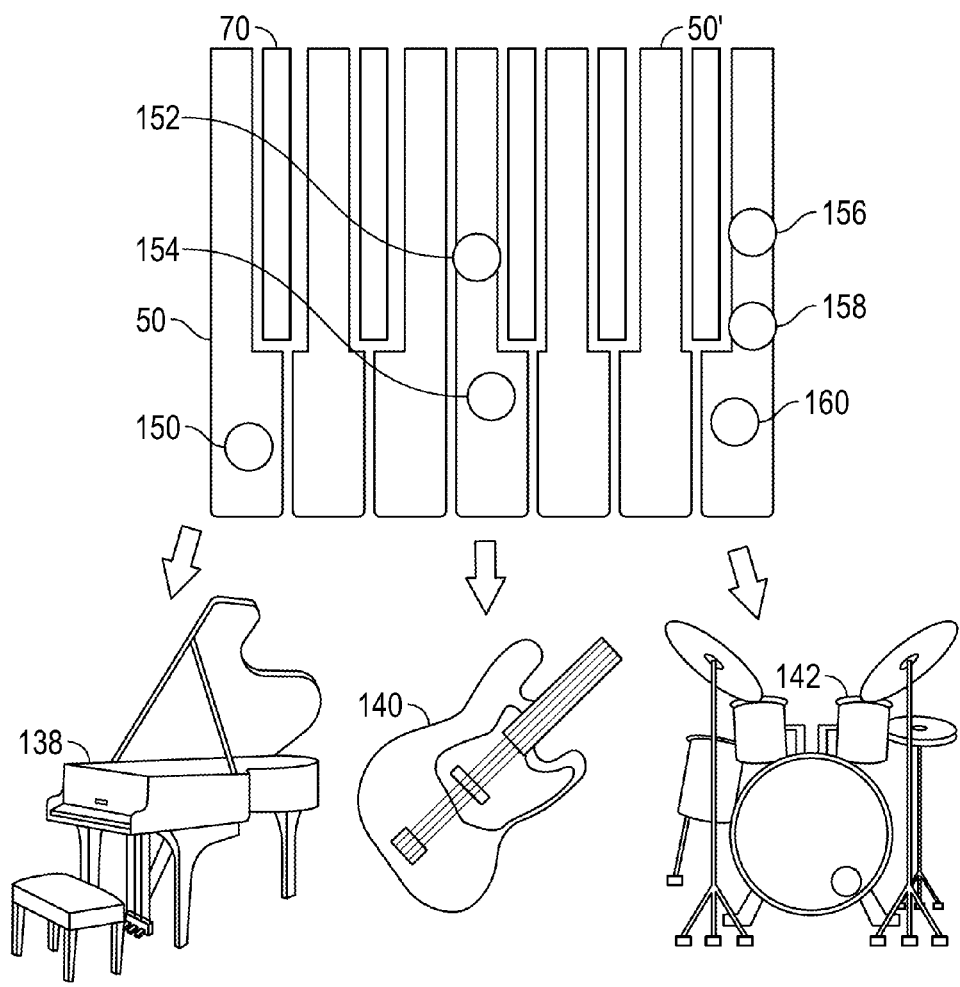
FIG. 8 is a systematic representation showing different musical instruments represented by a different number of touches on the piano key according to an exemplary embodiment of the present invention.

System 99 can also be used to generate different timbres, or musical instrument sounds. On each key press, the number of fingers on the key selects between one of three different types of instruments. Incoming MIDI Note On messages (part of the MIDI specification (available at www.midi.org), which indicate a note should begin (e.g. when a key is pressed)) are routed to one of three MIDI channels depending on how many fingers are currently on the corresponding key. MIDI Note Off messages are sent all three channels to avoid notes inadvertently remaining on after the key has been released. For example, as shown in FIG. 8, a single finger press 150 corresponds to a sound generated by a piano 138; two presses 152, 154 correspond to a sound generated by guitar 140; and three presses 156, 158, 160 correspond to a sound generated by drums 142. This arrangement allows a performer to play multiple instruments simultaneously from a single keyboard, with instrument selection performed on a note-by-note basis. Alternatively, instead of just a piano sound, system 99 can be programmed such that a key press generates organ, harpsichord, other keyboard-type sounds.

In addition to using system 99 to generate novel sounds and sound patterns, touch location information generated by system 99 may also allow automatic detection of piano fingering patterns. Because the thumb and pinky fingers do not extend as far as the three middle fingers, keys played with these fingers tend to be touched nearer to the front edge of the key. Also, the thumb, on account of its flatter angle with respect to the keys, may also produce a larger contact area in many situations. Contact area allows an additional dimension of control over each note played on key 50, 50', 70. These observations, coupled with the knowledge of the mechanics and limitations of the human hand, allow for the automatic extraction of fingering patterns from touch data, which can be used during the training of a novice piano player. Additionally, contact area can be used to estimate certain gestural features of keyboard playing. For example, many piano teachers consider it important to play with rounded (curved) fingers, such that the fingertips, rather than the flat surfaces of the fingers, contact the keys. Contact area sensing can be used to evaluate whether the pianist plays this way.

In an exemplary embodiment, referring back to FIG. 2, host controller 120 120 can transmit a controller signal to a display 123 that displays a configuration of keys 50, 50', 70, such as for example, octaves 100 and 110. As each key 50, 50', 70 is struck, display 123 displays a representation of where each particular key 50, 50', 70, along with an approximate contact area of the player's finger(s) on the keys 50, 50', 70, which can be represented by a variable sized circle, similar to those illustrated in FIG. 4.

Figure 9:
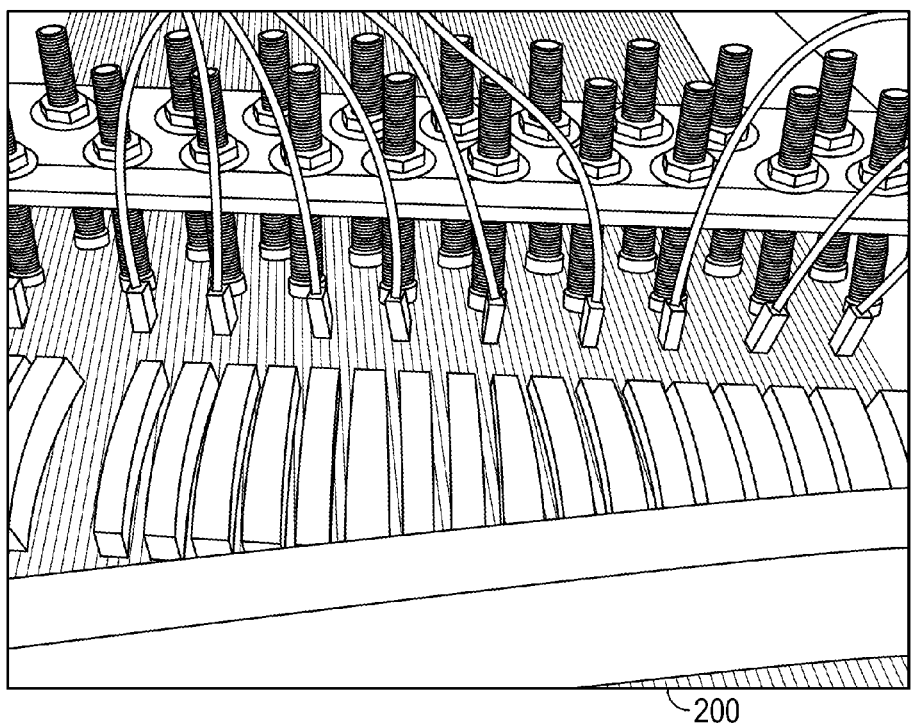
FIG. 9 illustrates an electromagnetic piano string actuation assembly that may be used with the present invention.

System 99 can be used by itself with an acoustic or electronic piano or in conjunction with an electromagnetic piano string actuation assembly 200, which is shown in FIG. 9. Electromagnets located above each strain induce the piano strings to vibration independently of the piano hammer mechanism, allowing the performer to continuously shape the sound of every note in real-time. The touch data generated by the keys of the present invention is used to control signals to the electromagnets in multiple independent dimensions, including, but not limited to, volume, pitch, and waveform.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A musical keyboard touch sensor pad comprising:
   (a) a plurality of integrated touch sensors disposed in an array, the plurality of integrated touch sensors representing a keyboard key, wherein each of a first group of the plurality of sensors are generally saw-tooth shaped and are longitudinally arranged adjacent to each other; and
   (b) a processor electronically coupled to the plurality of integrated touch sensors, the processor being programmed to receive input from several of the plurality of integrated touch sensors and to generate a sound signal based on the input from the several of the plurality of integrated touch sensors, the sound signal being variable based on the number in the plurality and the location of the plurality in the array, wherein the processor is adapted to process a touch moving longitudinally along the array to generate a pitch change signal based on the length and speed of the longitudinal movement.

2. The musical keyboard touch sensor pad according to claim 1, wherein the processor is adapted to process a plurality of touches on the array and to generate a sound based on the number and configuration of touches on the array.

3. A musical keyboard touch sensor pad comprising:
   (a) a plurality of integrated touch sensors disposed in an array, the plurality of integrated touch sensors representing a keyboard key, wherein each of a first group of the plurality of sensors are generally saw-tooth shaped and are longitudinally arranged adjacent to each other; and
   (b) a processor electronically coupled to the plurality of integrated touch sensors, the processor being programmed to receive input from several of the plurality of integrated touch sensors and to generate a sound signal based on the input from the several of the plurality of integrated touch sensors, the sound signal being variable based on the number in the plurality and the location of the plurality in the array, wherein the processor is adapted to process a touch moving back and forth on some of the plurality of touch sensors and to generate a vibrato signal based on the back and forth movement.

4. The musical keyboard touch sensor pad according to claim 1, wherein the processor is adapted to process a first touch moving longitudinally in a first direction along the array, process a second touch moving longitudinally in a second direction, opposite the first direction, and to change an amplitude of the sound signal based on the movement of the first touch and the second touch.

5. A musical keyboard touch sensor pad comprising:
   (a) a plurality of integrated touch sensors disposed in an array, the plurality of integrated touch sensors representing a keyboard key, wherein each of a first group of the plurality of sensors are generally saw-tooth shaped and are longitudinally arranged adjacent to each other; and
   (b) a processor electronically coupled to the plurality of integrated touch sensors, the processor being programmed to receive input from several of the plurality of integrated touch sensors and to generate a sound signal based on the input from the several of the plurality of integrated touch sensors, the sound signal being variable based on the number in the plurality and the location of the plurality in the array, wherein the processor is adapted to calculate a size and a position of a centroid based on a plurality of touches on the array and to generate a logical signal based on the size and the position of the centroid.

6. The musical keyboard touch sensor pad according to claim 5, wherein the processor is adapted to generate a sound based on the size and the position of the centroid.

7. A method of generating a sound from a piano-style key comprising the steps of:
   (a) placing a sensor array on the key, the sensor array being comprised of a plurality of integrated sensors, the sensor array being electronically coupled to a processor;
   (b) receiving a first impact and a second impact on the key such that at least one of the plurality of integrated sensors are struck by each of the first and second impacts;
   (c) transmitting an electronic input signal to the processor based on the location and type of the strike on each of the at least one of the plurality of the integrated sensors;
   (d) generating an electronic sound signal from the controller based on the electronic input signal;
   (e) sensing a change of the linear distance between the first impact and the second impact; and
   (f) generating a change in the electronic sound signal in response to the change of the linear distance.

8. The method according to claim 7, wherein the electronic sound signal generated in step (d) comprises a non-piano-type sound.

9. The method according to claim 8, wherein the electronic sound signal generated in step (d) varies upon a variation of the plurality of simultaneous strikes.

* * * * *